United States Patent [19]
Oryhon et al.

[11] Patent Number: 5,184,959
[45] Date of Patent: Feb. 9, 1993

[54] PROGRAMMABLE TOOTHBRUSH ALARM UNIT

[76] Inventors: Harry W. Oryhon; Jeremy Oryhon, both of 13627 Kickapoo Trail, Lockport, Ill. 60441

[21] Appl. No.: 769,058

[22] Filed: Sep. 30, 1991

[51] Int. Cl.⁵ .................................................. A46B 9/00
[52] U.S. Cl. .................................... 434/263; 132/308
[58] Field of Search ............... 434/263; 433/215, 216, 433/77; 132/308-311; 368/1, 97, 98, 99; 273/237, 238; 15/1, 105; 221/3; 222/106, 39

[56] References Cited

U.S. PATENT DOCUMENTS

| | | |
|---|---|---|
| 2,926,487 | 3/1960 | Stone . |
| 3,894,550 | 7/1975 | Eaton . |
| 3,998,234 | 12/1976 | Stubbmann . |
| 4,253,212 | 3/1981 | Fujita .............................. 434/263 X |
| 4,341,230 | 7/1982 | Siahou . |
| 4,716,614 | 1/1988 | Jones et al. ...................... 434/263 X |

Primary Examiner—Richard J. Apley
Assistant Examiner—Glenn E. Richman
Attorney, Agent, or Firm—Lockwood, Alex, FitzGibbon & Cummings

[57] ABSTRACT

A programmable device which emits an audible alarm to indicate one or more preselected toothbrushing times includes a display member set in a device housing, the housing having a number of toothbrush accommodating slots, each of the toothbrush-accommodating slots having an alarm switch associated therewith, the switch being disposed in an individual alarm circuit. The alarm switch is activated and reset by removal and insertion of the toothbrush into the slot.

20 Claims, 2 Drawing Sheets

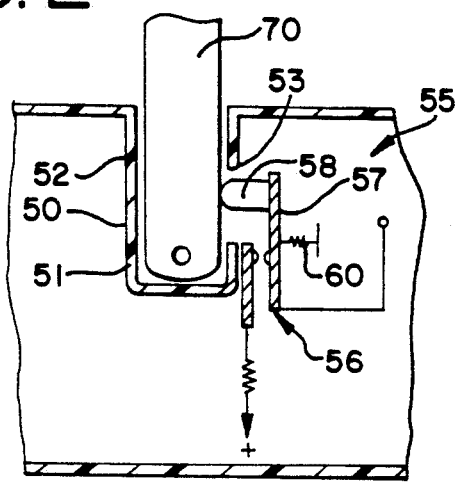
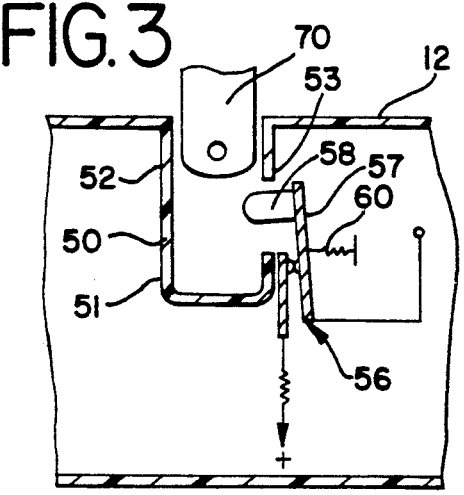
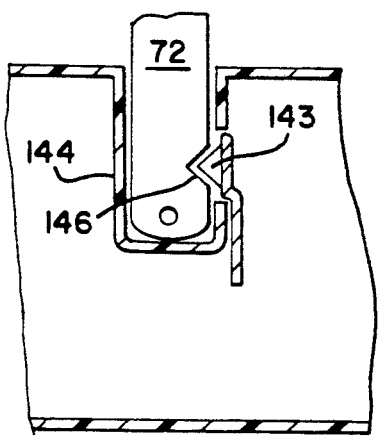
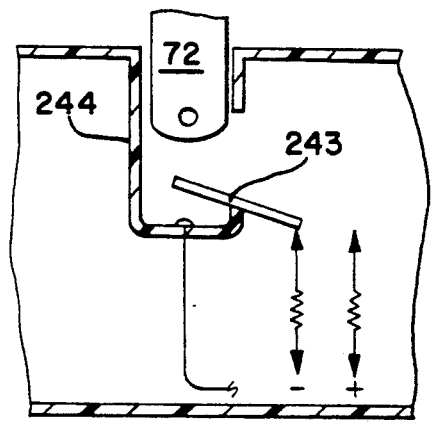
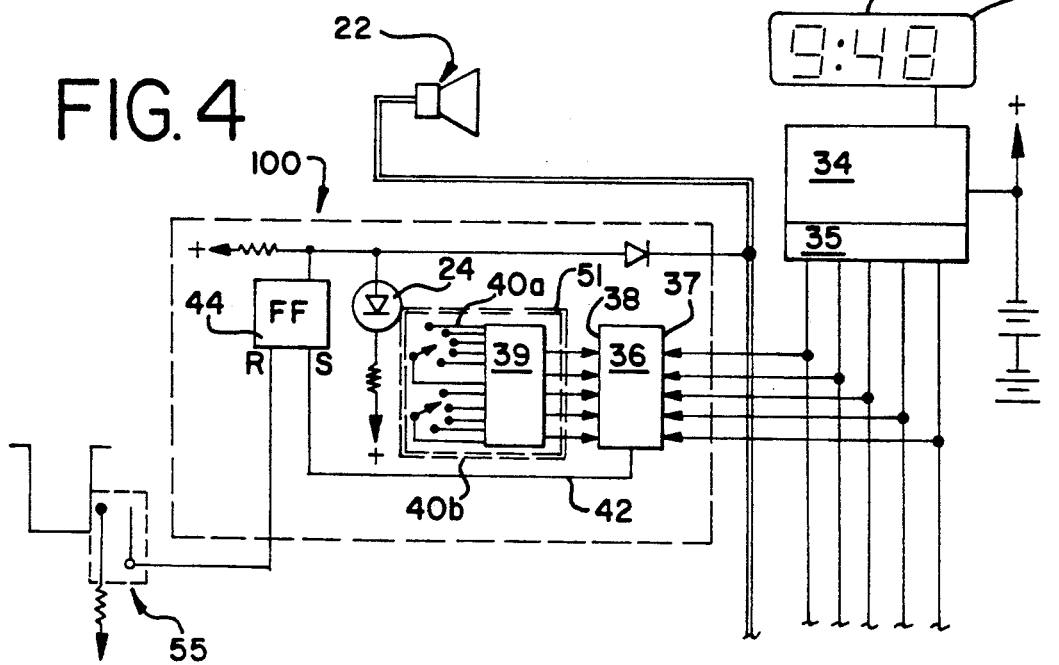

PROGRAMMABLE TOOTHBRUSH ALARM UNIT

BACKGROUND AND SUMMARY OF THE INVENTION

The present invention relates generally to devices for holding one or more toothbrushes and for notifying a user when it is time to brush, and more particularly, to a device which holds one or more toothbrushes and which is programmable such that it notifies a user when it is time to brush and resets for another alarm cycle when the toothbrush is replaced in the device.

Several devices have been known in the art which hold one or more toothbrushes and which provide a visual incentive for a user, typically a child, to brush his or her teeth for a preselected period of time. Generally, these devices have included a visual display in the form of a mechanically animated animal. The animation of the device begins by depressing a switch or by removing the toothbrush. The animation assembly is controlled by an independent timer so that the animation begins for a preselected time when the assembly is activated. Such animation assemblies are exemplified by U.S. Pat. No. 2,926,487 and 3,021,666 to Stone and by U.S. Pat. No. 3,998,234 to Stubbmann.

The devices disclosed in the above listed three patents suffer from certain disadvantages. On disadvantage is that they typically contain a mechanical timer driven by a spring which spring needs to be rewound after every brushing by the user. The timers for these devices only operate while the user is brushing his teeth and thus these devices are incapable of signalling one or more preselected times when to brush. In these devices, the removal of the toothbrush in the devices begins the animation cycle and replacement of the toothbrush stops the cycle, and thus these devices only attempt to enhance the desirability of brushing, but do nothing to remind or signal the user when to brush. Another disadvantage of these devices is that they only accommodate one brush and do not have a signalling means capable of signalling brushing times for multiple, independent users.

The present invention is therefore directed to a device which avoids the aforementioned disadvantages and which provides a means for individually notifying one or more users at various preselected times for brushing. The present invention overcomes such disadvantages by providing a housing or base member with one or more receptacles or cavities, each of which is adapted to receive a toothbrush therein. The housing contains an audible or visual alarm mechanism operatively connected with each of the toothbrush receptacles and to a timing means by way of a series of individual circuits associated with each receptacle to define individual alarm circuits associated with each toothbrush. The timing means may be set to activate the alarm mechanism such that when a preselected time occurs, the alarm is activated for a particular toothbrush. Removal of that toothbrush from its associated receptacle silences the alarm. When the toothbrush is reinserted into the receptacle, the alarm mechanism for that receptacle and toothbrush is reset. Multiple alarm circuits are provided in the housing which are equal in number to that of the toothbrush receptacles so that an entire family of users can be easily accommodated in the device.

Accordingly, it is an object of the present invention to provide a programmable toothbrush alarm device which accommodates a plurality of toothbrushes in a housing and wherein the housing includes alarm means which operatively engage each of the toothbrush handles to provide an audible alarm circuit associated with each toothbrush.

It is a further object of the present invention to provide a device which holds a plurality of toothbrushes in individual slots, each of the slots having an alarm switch associated therewith, each of the alarm switches comprising an individual alarm circuit, each of the alarm switches being activated by the insertion or removal of a toothbrush handle into the slot.

It is yet another object of the present invention to provide a toothbrush alarm unit which generates an audible or visual indication at any number of preselected times to remind a plurality of toothbrush users of the proper time to brush, the toothbrush alarm unit including a housing, a plurality of receptacles being disposed in the housing, each of the receptacles being adapted to receive a toothbrush therein, each of the receptacles having an individual alarm circuit associated therewith, the housing further containing timing means which is interconnected to the receptacles and to each of the individual alarm circuit associated therewith, the alarm mechanism being triggered when a signal from the timing means equals that of a preselected time, the alarm mechanism being shut off by removal of the toothbrush and subsequently reset when the user has completed brushing and reinserted the toothbrush into the receptacle.

It is still another object of the present invention to provide an alarm unit for multiple toothbrushes held within individual slots in the unit housing which alarm generates either a visual or audible alarm at a preselected brushing time, the alarm being shut off by removal of the toothbrush by the user and the alarm being reset by insertion of the toothbrush into the slot.

These and other objects and advantages of the present invention will be clearly understood through a consideration of the following detailed description.

BRIEF DESCRIPTION OF THE DRAWINGS

In the course of this detailed description, reference will be frequently made to the attached drawings in which:

FIG. 2 is a partial sectional view taken along lines 2—2 of FIG. 1 illustrating a toothbrush in place within a recess of the toothbrush alarm unit of FIG. 1;

FIG. 3 is illustrates the toothbrush being removed from the recess of FIG. 2;

FIG. 4 is a schematic diagram of an alarm circuit associated with one of the toothbrush receptacles of the alarm unit of FIG. 1;

FIG. 5 is a sectional view of illustrating an alternative receptacle switch construction; and, FIG. 6 is a sectional view of illustrating another alternative receptacle switch construction.

DETAILED DESCRIPTION OF THE PREFERRED EMBODIMENTS

Figure 1:
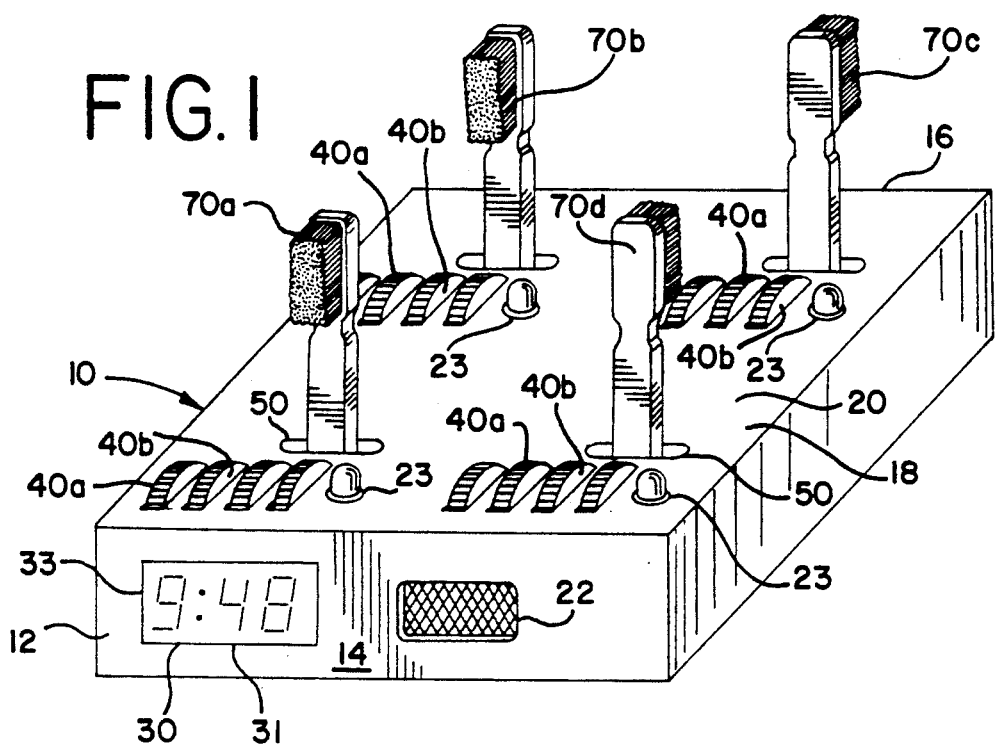
FIG. 1 is a perspective view of one embodiment of a toothbrush alarm unit incorporating the principles of the present invention.
Figure 7:
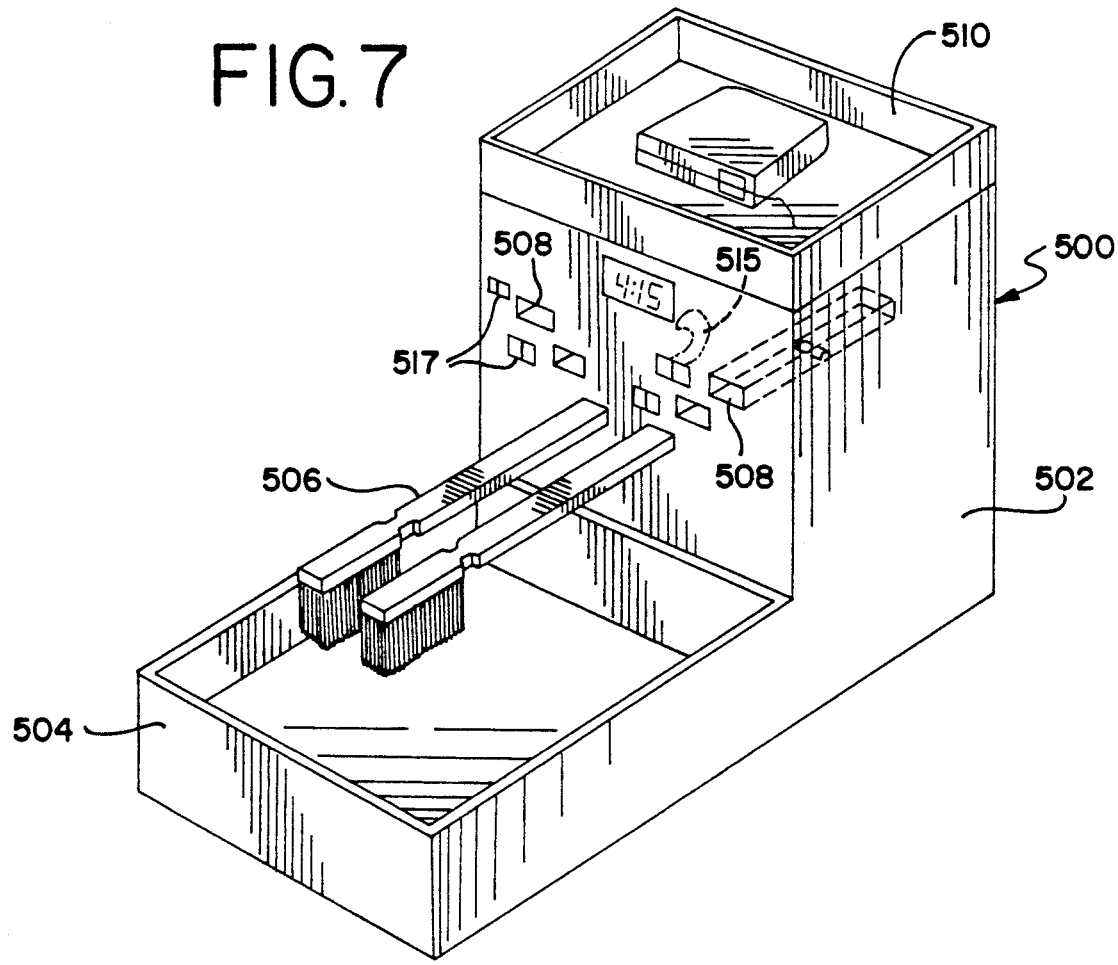

FIG. 1 illustrates a first embodiment of a toothbrush alarm device constructed in accordance with the principles of the present invention, generally designated 10. The device 10 is provided with an exterior housing 12 which may be easily molded from plastic or formed or cast from metal or other suitable material. The housing 12 has a display panel 14, a rear access panel 16, a base panel 18 and a toothbrush holding portion 20. The exact configuration of the housing is not critical to effective operation of the present invention, as shown by FIG. 7 in which the toothbrushes are held horizontally, and may be varied to suit commercial requirements.

The housing 12 contains an internal alarm mechanism 22 which is electrically operated by either a power cord or a storage battery 26 as shown. The alarm mechanism 22 may utilize either an audible noise generating assembly or may utilize a visual indicator such as a flashing indicator light 23, or a combination of the two.

In an important aspect of the present invention, and as illustrated best in FIG. 4 which illustrates one of the individual circuits 100 associated with a toothbrush receptacle 50a, the alarm mechanism 22 has a timing mechanism 30, such as a clock 31, associated therewith which preferably includes a visual display portion 33. The clock 31 may be operated by a conventional clock chip 34 of the type having data bus 35 commonly available which transmits a standard time signal as an output.

In this regard, the clock chip 34 and the data bus 35 associated therewith are interconnected to a comparator 36 along a first input side 37 thereof. The comparator 36 is connected, at a second input side 38, to a signalling assembly 51 incorporating a conventional binary encoding chip 39. The binary encoding chip 39 is associated with one or more switches, disposed in the housing 12 in association with each receptacle 50. These switches are illustrated as thumb switches 40a, 40b which the user can set for preselected brushing times for its associated receptacle 50. Where two such switches 40a, 40b (shown in FIG. 1 arranged in a side-by-side format) are used for each toothbrush receptacle 50, one switch 40a may be set for a first preselected time, such as 8:00 a.m., while the other switch 40b can be set for a different, second preselected time, such as 9:00 p.m. The binary encoding chip 39 converts the times designated by the thumb switches 40a, 40b in a manner recognized to the art into an output signal easily recognized by the comparator 36. The thumb switches 40a, 40b therefore provide one or more preset times to the comparator 36 in a digital format.

As the clock chip 34 sends out its time signal(s), the comparator 36 continuously compares that time signal to that received from the encoding chip 39. When the digital input to the comparator 36 from the clock data bus 35 matches one of the similar inputs to the comparator 36 from the encoding chip 39, the comparator 36 generates an electronic pulse at its output end 34 which travels along a path 42 to the "set" side, S of a flip-flop (FF) 44. In this instance, the FF 44 generates a high output which triggers the audible alarm 22 or lights a visual indicator 23, such as a light-emitting diode (LED) 24. A user responds to the alarm by removing the toothbrush 70 from the indicated receptacle 50 and the alarm 22 and indicator light 23 are then deactivated. This deactivation is accomplished by a switch means 55 associated with the particular receptacle 50 which is triggered by the removal of the toothbrush 70, as will be explained in greater detail below. When triggered, the switch means 55 completes a circuit and sends an electrical pulse to the reset end (R) of the FF 44 which then causes the FF to reset. When the reset occurs, the output of the FF is low which disables the alarm 22 and shuts off the visual indicator light 23.

Turning now to the details of the switch means associated with each of the toothbrush receptacles 50, it can be seen that the receptacles 50 may take the form of elongated wells or recesses 51 which are defined by a sidewall 52 which extend inwardly of the housing 12 (shown downwardly in FIGS. 1-3). Each of the receptacles 50 are adapted to receive a substantial extent of the handle portion 72 of a single toothbrush 70 therein. As described above and as illustrated in FIG. 4, the housing 12 contains individual alarm circuits 100 which are equal in number to the number of receptacles 50 and which extend between the alarm clock assembly and each toothbrush receptacle 50. Each receptacle 50 has a switch means 55 associated therewith which is responsive to the insertion and removal of the toothbrush handle 72 into the receptacle 50. The switch means 55 are preferably of the pressure-sensitive type, as illustrated in the embodiment of FIGS. 1-3 and may include a cam-style switch 56 having a lever 57 adapted for movement in and out of the receptacle 50 by way of a slot 53. The lever 57 of the switch 56 has a protruding cam portion 58 which extends into the receptacle 50 for a predetermined distance in one switching position.

The switch cam portion 58 is normally biased into the receptacle 50 by a conventional spring 60. When the user initiates the device 10 by inserting the toothbrush 70 into the receptacle 50 for the first time, he breaks contact with the switch 56. The toothbrush handle 72 applies pressure against the cam 58 to maintain the switch 56 in the open position. As described above, when the alarm 22 is activated and the user removes the toothbrush 70 from the receptacle 50, the cam 58 is forced into the receptacle 50 by the spring 59 to close the switch 56.

FIG. 5 illustrates an alternative switch construction in which the switch 140 has a flexible switch arm or lever 142 which an extending tang 143 protruding into the receptacle 144 when no toothbrush is present therein. In such instances, the toothbrush handle 72 may be specifically configured, such as to provide an inward detent 146 to accommodate the switch tang 143.

Similarly, and as shown in FIG. 6, the switch 240 may be disposed in the receptacle 244 itself and rely upon the pressure or absence of the weight of the toothbrush to actuate the flip-flop. In this construction, the switch lever 242 will take the form of a pivoted member or bar 243 which is held in the open position by the weight of the toothbrush 70 and when the toothbrush 70 is removed, the bar 243 pivots to complete the reset circuit.

Lastly, as shown best in FIG. 7, the housing 502 of the alarm unit 500 may include accessories such as a removable drip pan 504 located beneath the toothbrushes 506 which may catch drippings and the like when the toothbrush 506 is reinserted into the appropriate receptacle 508 while still wet. The housing 502 may also be provided with one or more tray portions 510 to receive accessories such as dental floss and the like. Such a housing 502 of the alarm unit 500 may include one or more digital electronic alarm circuits 515 which enable the user(s) to select the times for activation of the brushing alarm by pressing the appropriate timer buttons 517.

It will be appreciated that the embodiments of the present invention which have been discussed are merely illustrative of a few of the applications of the principles of the present invention. Numerous modifications may be made by those skilled in the art without departing from the true spirit and scope of the invention.

We claim:

1. A programmable device for storing one or more toothbrushes and having an alarm associated with each toothbrush, the device indicating the time for brushing, comprising:

a housing, alarm means disposed in said housing for indicating to a toothbrush user one or more preselected times for using a toothbrush, clock means for supplying a variable time signal to the alarm means, a plurality of slot means disposed in said housing, each of the slot means being adapted to receive a handle of a toothbrush therein, means for designating at least one preselected time for each of said slot means, the designating means supplying a set time signal to the alarm means, means for comparing the clock means variable time signal to said designating means set time signal, switch means associated with each of said slot means and activated in response to movement of a toothbrush therein, said switch means including a pressure-sensitive switch having a switch member which is partially disposed in said slot means, whereby, when said clock means variable time signal and said designating means set time signal are equal, the comparison means trigger said alarm means to thereby indicate time for brushing with a toothbrush disposed in a designated recess and whereby removal of said toothbrush trips said pressure-sensitive switch to shut off said alarm means and reset said alarm means.

2. The device of claim 1, wherein said housing includes at least two slot means.

3. The device of claim 1, wherein said plurality of slot means includes a plurality of elongated recesses disposed vertically in said housing.

4. The device of claim 3 wherein said slot means includes a plurality of elongated recesses disposed horizontally in said housing.

5. The device of claim 1, wherein said alarm means includes an alarm.

6. The device of claim 1, wherein said alarm means includes a plurality of visual indicators, each of the visual indicators associated with a single toothbrush recess.

7. The device of claim 4, wherein said alarm means further includes a plurality of visual indicators, each of the visual indicators being associated with a single toothbrush recess.

8. The device of claim 1, wherein said switch member includes a cam biased by spring means to extend into said recess, the cam contacting said toothbrush handle portion when said toothbrush occupies said recess.

9. The device of claim 1, wherein said switch member includes a pivoting bar partially disposed in said recess and which occupies a portion of said recess.

10. A device for holding multiple toothbrushes and emitting an alarm signal to indicate at least one preselected time when an individual toothbrush should be used by a user, the device comprising, a housing having a plurality of elongated recesses, each of the recesses being adapted to receive an individual toothbrush therein, means associated with each recess for designating at least one preselected time for brushing with said individual toothbrush by a user, said time designating means including means for generating a fixed time signal alarm means for generating an alarm in response to an initiation signal, said device further comprising a clock means for generating a variable time signal, means for comparing said clock means variable time signal to said designating means fixed time signal and sending the initiation signal when said fixed and variable time signals are equal to said alarm means and switch means responsive to movement of said individual toothbrush in said recess, said switch means shutting off and resetting said alarm means when said toothbrush is removed from said recess.

11. The device of claim 10, wherein said housing includes four recesses and said alarm means includes a visual indicator associated with each of said recesses.

12. The device of claim 10, wherein said time designating means includes at least one rotary indicator.

13. The device of claim 12, wherein said time designating means includes a plurality of thumb switches.

14. The device of claim 10, further including a plurality of visual indicators, each of said visual indicators being associated with a single recess.

15. The device of claim 10, wherein said plurality of elongated recesses are disposed horizontally in said housing.

16. The device of claim 10, wherein said switch means includes at least one switch member biased into one of said recesses, said at least one switch member contacting a portion of a toothbrush inserted into said one recess.

17. The device of claim 16, wherein said at least one switch member includes a cam biased by spring means.

18. The device of claim 10, further including a drip pan disposed proximate to said toothbrushes.

19. The device of claim 10, further including means for receiving dental accessories.

20. The device of claim 10, wherein said time designating means includes a digital time setting circuit.

* * * * *